Feb. 5, 1952　　　A. M. HILLERY, JR　　　2,584,583
MEANS FOR OPTICALLY DETERMINING RELATIVE THICKNESS
OF SURFACE COATINGS ON GLASS ARTICLES AND THE LIKE
Filed Jan. 18, 1947
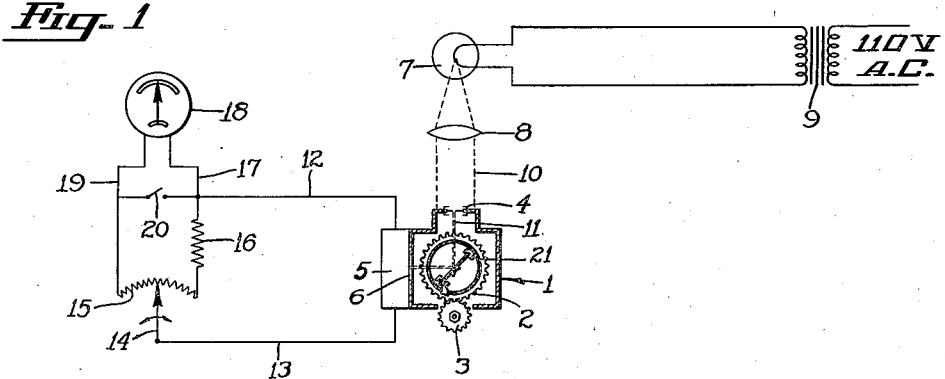
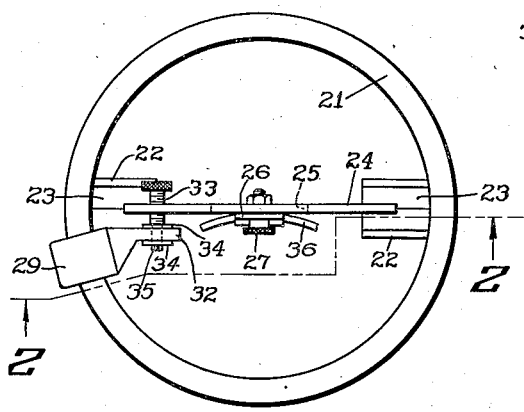
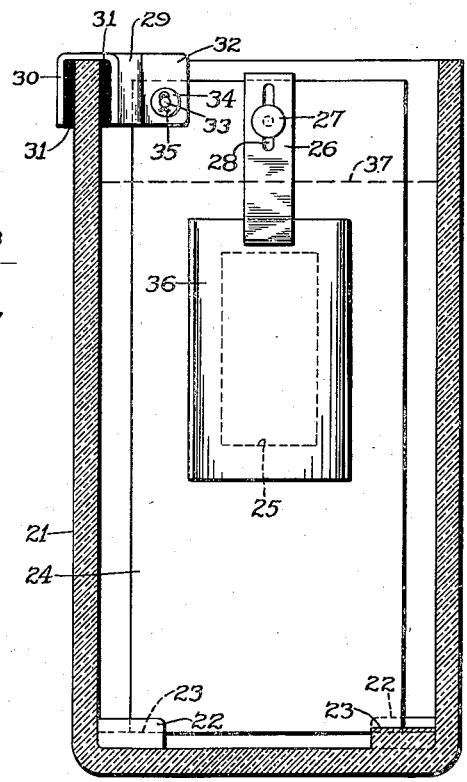
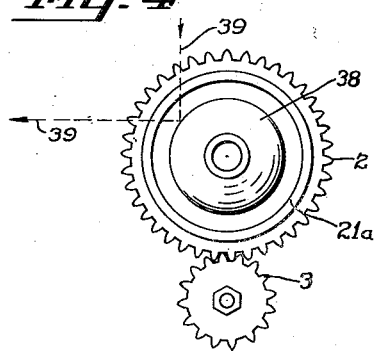
Inventor
Arthur M. Hillery Jr.
by Parham & Bates
Attorney Patented Feb. 5, 1952

2,584,583

UNITED STATES PATENT OFFICE 2,584,583

MEANS FOR OPTICALLY DETERMINING RELATIVE THICKNESS OF SURFACE COATINGS ON GLASS ARTICLES AND THE LIKE

Arthur M. Hillery, Jr., Hartford, Conn., assignor to Emhart Manufacturing Company, a corporation of Delaware Application January 18, 1947, Serial No. 722,776

5 Claims. (Cl. 88—14)

This invention relates generally to improvements in the field of inspection equipment for determining the condition of surface coatings applied to glass articles. More specifically, it relates to improvements in inspection equipment for optically determining the relative thickness of thin protective coatings applied to glass articles such as bottles, jars and other containers.

An object of this invention is to provide a means for determining the thickness of thin coatings applied to glass articles.

Another object of this invention is to provide a means for determining the relative thickness of extremely thin, invisible surface protective coatings, applied to glass articles, by means of measurement of the relative reflectivity of a portion of the article coated.

A further object of the present invention is to provide means for measuring the relative reflectivity of extremely thin coatings on a portion of an entire glass container.

A still further object of the present invention is to provide a simple, reliable, durable and portable control instrument for determining the relative thickness of protective coatings applied to articles treated by "iridizing" processes.

It is also an object of the present invention to provide means for comparing the relative thickness of visible iridescent coatings applied to a plurality of glass articles.

As described in U. S. Patent No. 2,375,482 on Apparatus for Coating Glass Articles, issued to Aaron K. Lyle, on May 8, 1945, thin coatings may be applied to glass articles by treating them with fumes of a substance, such as stannic chloride or titanium chloride, when the articles are maintained in a suitable atmosphere. The surface treatment produces a coating (believed to be metallic oxide) which has certain highly desirable protective properties. This coating process is known in the art as "iridization." The coating resulting from the process may be extremely thin, the thickness being in the order of magnitude of the wave length of light. Articles so coated may have iridescent properties having spectral casts typical of iridescent surfaces. Because of the extreme thinness of the coating, an exact measurement of its thickness is difficult, if not impossible, to obtain practically. It is within the purview of the present invention to provide a manner of comparing articles, having extremely thin coatings, so that the relative thickness of the coatings thereon may be readily ascertained without requiring a high degree of skill on the part of the operator.

An article, treated according to the teachings of the hereinbefore cited patent, is water repellent and tends to resist abrasion when rubbed against another glass article. This abrasion resistance is highly desirable on articles that must be handled by automatic machinery and that may come into contact with other articles being handled.

The thickness of the surface coating depends in part on the length of time that the article is exposed to fumes in the coating process and also on the concentration of the fumes. It is possible to coat the article to a thickness sufficient to produce a readily visible iridescent coloration. However, the highly desirable properties of the surface coating may be obtained when the thickness of the coating is so thin as to be almost invisible under the most careful scrutiny of the naked eye. Both from the viewpoint of economy of operation of the coating process and from the desirability of leaving the high degree of transparency of a clear glass article unimpaired, it is considered advantageous to coat most articles with an invisible coating. Prior to the present invention, the determination of the relative thickness of coatings on a plurality of articles so treated was practically impossible. However, as will be disclosed more completely hereinafter, it has been found that the reflectivity of a coated surface of a glass article increases proportionately to the thickness of the surface coating. The present device and method utilizes this physical characteristic of coated articles to provide a ready determination of the relative coating thickness and will be described presently in conjunction with the accompanying drawings, in which:

Fig. 1 is a schematic view of a control instrument, showing a coated sample in position to be examined and showing light rays impinging thereon and being reflected therefrom;

Fig. 2 is a vertical section view taken on plane 2—2 of Fig. 3 showing the details of construction of a sample retainer and its adjusting means;

Fig. 3 is a top plan view of the sample retainer showing the mounted position of the sample to be examined and showing additional details of the adjusting means shown in Fig. 2; and Fig. 4 is a diagrammatic view of an entire coated bottle and the bottle rotating means for supporting it in position to be examined.

Referring first to Fig. 1, a housing, generally designated 1, surrounds a mounting gear 2 engaged with which is an adjusting gear 3. Gears 2 and 3 are pivoted for rotation in a horizontal plane. It is to be noted that gear 3 projects outwardly from one side of housing 1 and may be used to adjust the angular position of gear 2, as desired. An iris diaphragm 4 may be provided in another side wall of housing 1. A photoelectric cell 5 is secured to housing 1 adjacent to an opening 6 provided in still another side wall thereof. An external light source 7 emits light rays which are collimated by lens 8 to form parallel light rays 10 (indicated by dotted lines). Light source 7 may be energized by any suitable electrical source, such as 110 volts A. C., and may be fed from a step down transformer 9. Iris diaphragm 4 may be adjusted to prevent the passage of a majority of the parallel light rays into housing 1, only a small beam of parallel light rays 11 being permitted to pass thereinto. This beam of light may be reflected from the surface of the sample to be examined to the photoelectric cell, as will be described more fully hereinafter.

Photoelectric cell 5 may be connected to an associated electrical circuit by electrical lines 12 and 13. Line 13 is connected to a movable contact finger 14 which bears on an arcuate resistor winding of variable resistor 15. One end of resistor 15 is connected to one end of a fixed resistor 16, the other end of the fixed resistor being connected by electrical connecting line 17 to a microammeter 18. A second electrical line 19 connects the microammeter 18 to the other end of variable resistor 15. A manually operated single throw, single pole switch 20 may be connected between lines 17 and 19. It is to be noted that electrical line 12 is also joined to line 17.

The details of construction of the sample retainer may be seen in Figs. 2 and 3. The sample is suspended within a container 21 made of glass or other suitable transparent material and resting concentrically upon the gear 2 as shown. This container has a pair of lugs 22 made integral with the bottom thereof and may be formed to define V-shaped grooves 23 in an upper portion of the lugs. Lugs 22 are diametrically opposed as shown in Fig. 3. A retainer plate 24 is positioned within container 21 with its lower end resting in the grooves 23. Retainer plate 24 has a rectangular hole 25 therethrough above which is secured a spring finger 26. Spring finger 26 is secured to plate 24 by conventional fastening means 27. A slot 28 may be provided to permit adjustment of the spring finger.

A positioning bracket 29 is provided on the top edge of container 21. This positioning bracket has a U-shaped portion 30 which is adapted to fit over the upper edge of container 21. A pair of rubber cushions 31 may be disposed between the U-shaped portion of the positioning bracket and the wall of the container so that the positioning bracket is frictionally maintained in position. The positioning bracket has a projection 32 at one side thereof. An adjusting screw 33 is threaded through retainer plate 24 and passes through projection 32. Washers 34 are provided on adjusting screw 33 on both sides of projection 32. A cotter pin 35 may be provided transversely through the end of adjusting screw 33.

A sample 36, the opposite faces of which respectively may be convexly and concavely curved, may be clamped to one surface of the retainer plate by means of spring finger 26, the sample being so positioned that its convex face is in juxtaposition to the adjacent surface of the retainer plate. This sample has been shown in the drawings to be of a shape such as that which would be obtained by cutting a portion of the lateral wall section out of a generally circular glass bottle or jar. This is the most commonly used shape of sample although samples of other shapes may be used with equal facility. Spring finger 26 may be adjusted vertically to accommodate the size of the sample being examined. In practice, positioning bracket 29 may be located so as to position retainer plate 24 in approximately a vertical position. Retainer plate 24 may be tilted slightly as desired by a suitable adjustment of adjusting screw 33. The purpose and manner of making this adjustment will be disclosed more fully hereinafter.

Xylene or any other suitable liquid, having approximately the same index of refraction as glass, may be poured into container 21 until any desirable level, such as that indicated at 37 in Fig. 2 has been attained. The only limitation on the amount of xylene used is that the sample being investigated be completely covered.

The operation of the hereinbefore described equipment will now be considered. Photoelectric cell 5 is of the photovoltaic type which will set up a potential across its terminals proportionate to the amount of light being received thereby. This potential is applied to the resistors of the meter circuit hereinbefore described. The meter circuit is rendered operative by the opening of switch 20, under which condition current flows between electrical lines 12 and 13 by two parallel paths, one path being composed of resistor 16 and a portion of variable resistor 15. The second path for the flow of electrical current is through meter 18 to line 19 and thence to line 13 by way of the remaining portion of variable resistor 15. The division of current flow through the two parallel paths of the electrical circuit will be determined by the division of resistor 15, as determined by the position of contact finger 14. The variable resistor, in effect, is a calibration element in the circuit and may be used to produce any desired reading on meter 18 for any given potential placed across lines 12 and 13. The meter circuit is rendered inoperative by the closing of switch 20, thus providing a short circuit across line 17 and 19, thereby effectively cutting meter 18 out of the circuit. Meter 18 may be calibrated in microamperes and fractions thereof or may be calibrated with any suitable scale, such as 0 to 100 with subdivisions thereof.

Housing 1 is light-tight and only permits the passage of light thereinto from iris diaphragm 4. Container 21, when filled with xylene and having the sample to be examined in position therein, is placed within housing 1 in such a position that the beam of light 11 impinges obliquely on the convex surface of the sample which is exposed through opening 25, and is reflected to the photoelectric cell. It is presumed for the purposes of this discussion that the sample has been previously coated on its convex face by a coating process such as that hereinbefore described. Screw 33 is adjusted until retainer plate 24 has approximately a vertical position. Retainer plate 24 may be swung about a vertical axis by a suitable adjustment effected by the rotation of gear 3. Thus, gear 3 and hence gear 2 is rotated slowly back and forth until a maximum reading is obtained on meter 18 for any given setting of variable resistor 15 and iris diaphragm 4. While in this position, adjusting screw 33 may be adjusted slightly, thus swinging the sample to be examined about a horizontal axis. This adjustment is continued by means of screw 33 and gear 3 until the maximum reading possible has been obtained on meter 18 for any given setting of the variable resistor and iris diaphragm. Should the intensity of illumination of light source 7 be excessive or should the reflectivity of the sample be relatively large, iris diaphragm 4 may be adjusted to diminish the amount of light passing into housing 1.

In practice, an adjustment of the device similar to that hereinbefore described is first made with a preferred sample of material in position, the sample being coated with protective material to a preferred thickness. With the preferred sample in place and the adjustment of its position completed, variable resistor 15 is adjusted until a preferred reading is obtained on meter 18. Any reading desired may be used although an arbitrary midpoint reading on the scale is usually found to be convenient. With the device calibrated as described, the preferred sample is removed and a test sample is substituted. Iris diaphragm 4 and the setting of resistor 15 are not changed but the adjustment of position of the sample is again made until a maximum reading is attained on meter 18. Inasmuch as the iris diaphragm is unchanged and the calibration setting of resistor 15 is not altered, the new maximum reading of the meter attained when the test sample is in a fully adjusted position will be indicative of the surface coating condition of the sample being investigated. Thus, it has been found in practice that the thicker the coating, the higher will be the reading of meter 18.

Once the meter has been calibrated with the preferred sample in a manner hereinbefore described, a series of samples to be examined may be checked with the disclosed device and may be graded according to the relative thickness of the coating thereon.

It is to be noted that no absolute measurement of thickness is made by the herein disclosed device. However, it has been found from an exhaustive series of experiments with a device made according to the teachings of this invention that the relative thickness of a series of coated articles may be ascertained with a high degree of accuracy. It is noteworthy that the device is of a very simple nature and economical to construct and is durable enough to serve admirably as a control instrument for use in the field in such places as articles may be surface treated.

The effect of the xylene surrounding the sample of material being investigated is to minimize any stray reflections that might normally result from the surfaces of the container 21 and from the concave surface of the sample being investigated. Thus, the operation of the instrument is constrained to be responsive to the condition of the surface coating alone and will not be interfered with in any way by stray reflections of light.

The use of the present inspection device is not limited to the investigation of surface coatings applied to clear, colorless glass articles. The device has been found to be effective when used in conjunction with colored articles such as those made from amber or green glass. This, no doubt, results from the fact that the instrument is predominantly responsive to reflection and in no way is responsive to the transmission of light by the articles being investigated.

The disclosed device is primarily intended for the relative thickness measurements of invisible protective coatings. However, the device may also be used to advantage as a comparator for grading glass articles that have a coating of a thickness sufficient to impart to the articles a noticeable, visible iridescent coloration.

The sample piece being investigated has been depicted in the accompanying drawings as a portion of a lateral wall section of a glass bottle or jar. It is to be noted, however, that the shape of the sample is not critical and that it may be a flat piece of glass as well as a curved piece. It is within the purview of the present invention to make the physical dimensions of the device sufficient to accommodate an entire bottle or jar thereby obviating the necessity for cutting a portion out of the wall section of the article. Fig. 4 shows schematically an entire bottle 38 in position within a container 21a which has been filled with xylene. Light rays 39, indicated by dotted lines, are shown impinging on a portion of the surface of the article being investigated. The operation of the associated equipment may be similar to that hereinbefore described whether an entire article is examined or whether the investigation is limited to a portion of a coated article.

It may be found advantageous to provide attaching means between container 21 and gear 2 so that no inadvertent change of position of container 21 can result in the course of the adjustment of the sample to obtain its ideal reflective position.

Having thus described my invention and several of its practical embodiments, I claim:

1. Apparatus for ascertaining the relative thickness of thin protective coatings on glass articles, such as coatings applied by treating the articles with fumes of a metallic salt, such as stannic chloride or titanium chloride, comprising means to produce a beam of parallel light rays, supporting means to support a glass article having a wall surface coated with such a coating in the path of said beam with said coated surface facing the beam, said supporting means including a container having a transparent side wall positioned in the path of said beam and holding a liquid having approximately the same index of refraction as the glass of the article, said article being completely immersed in said liquid within the container, said supporting means being adjustable to turn said coated surface angularly across the path of said beam, and electrical means including a photoelectric cell positioned adjacent said transparent wall to receive a beam of the light reflected from the coated surface of said article through said liquid and said transparent side wall, and a meter operatively connected with said cell so as to be responsive thereto, and calibrated to show departures of coating thickness of each coated article from a standard according to the amount of light reflected to the photoelectric cell from the coating of that article.

2. Apparatus as defined by claim 1 wherein said article supporting means is further adjustable to adjust the coated surface of the supported article about an axis lying in a plane perpendicular to the axis of angular turning movement of said surface.

3. Apparatus as defined by claim 1 for generally cylindrical glass articles and wherein said container is cylindrical and mounted for rotation about its vertical axis, and wherein a cylindrical article is supported upright approximately centered in said container in spaced relation to the transparent side wall.

4. Apparatus for ascertaining the relative thickness of thin protective coatings on glass articles, such as coatings applied by treating the articles with fumes of a metallic salt, such as stannic chloride or titanium chloride, comprising means to produce a beam of parallel light rays, supporting means to support a glass article having a wall surface coated with such a coating in the path of said beam with said coated surface facing the beam and so that said article is completely immersed in a liquid having approximately the same index of refraction as the glass of the article, said supporting means being adjustable to turn said coated surface angularly across the path of said beam, and electrical means including a photoelectric cell positioned to receive a beam of the light reflected from the coated surface of said article and a meter operatively connected with said cell so as to be responsive thereto, and calibrated to show departures of coating thickness of each coated article from a standard according to the amount of light reflected to the photoelectric cell from the coating of that article, and wherein said supporting means comprises an upright glass container rotatable about its vertical axis, said container having a transparent side wall positioned in the path of the beam and through which both the light rays to the supported article and the reflected beam from said article to said photoelectric cell pass, and wherein the photocell is positioned adjacent the walled portion of the container, a retaining plate in said container tiltably supported at its lower edge on the bottom of the container, plate-tilting means adjustably connecting an upper portion of said plate with the side wall of the container, said retainer plate having an aperture formed therein, means to secure the coated glass article to said retainer plate to expose the coated surface thereof through said aperture to said beam of parallel light rays, and wherein said liquid fills said container to a level sufficient to effect the aforesaid immersion.

5. Apparatus for ascertaining the relative thickness of thin protective coatings on glass articles, such as coatings applied by treating the articles with fumes of a metallic salt, such as stannic chloride or titanium chloride, comprising supporting means including a container having a transparent side wall and in which the coated wall of said article is supported completely immersed within the container in a liquid having approximately the same index of refraction as the glass of the article, means for producing and directing a beam of parallel light rays through said liquid to said coated surface, electrical means including a photoelectric cell, means for adjustably turning said article supporting means to turn said coated surface angularly across the path of said beam and reflect the beam of light from the coated surface through said liquid and container to the photoelectric cell, and a meter operatively connected with said cell so as to be responsive thereto, and calibrated to show departures of coating thickness of each coated article from a standard according to the amount of light reflected to the photoelectric cell from the coating of the article, and wherein said glass container is rotatable about a vertical axis and said photoelectric cell is positioned adjacent said container side wall, and including a retaining plate in said container tiltably supported at its lower edge on the bottom of the container, plate-tilting means adjustably connecting an upper portion of said plate with the side wall of the container, said retainer plate having an aperture formed therein, and means to secure the coated glass article to said retainer plate to expose the coated surface thereof through said aperture to said beam of parallel light rays.

ARTHUR M. HILLERY, JR.

REFERENCES CITED

The following references are of record in the file of this patent:

UNITED STATES PATENTS

| Number | Name | Date |
|---|---|---|
| 1,571,066 | Schulz | Jan. 26, 1926 |
| 1,939,088 | Styer | Dec. 12, 1933 |
| 2,127,477 | Carpenter et al. | Aug. 16, 1938 |
| 2,170,435 | Sweeney | Aug. 22, 1939 |
| 2,215,211 | Deval | Sept. 17, 1940 |
| 2,338,234 | Dimmick | Jan. 4, 1944 |
| 2,406,318 | Brace | Aug. 27, 1946 |